United States Patent [19]

De Young et al.

[11] 4,437,530

[45] Mar. 20, 1984

[54] VEHICLE AXLE ASSEMBLY

[75] Inventors: Simon A. De Young, Lyndhurst; Charles C. Gray, Chardon, both of Ohio

[73] Assignee: Euclid, Inc., Cleveland, Ohio

[21] Appl. No.: 417,764

[22] PCT Filed: Jan. 26, 1981

[86] PCT No.: PCT/US81/00094

§ 371 Date: Jul. 16, 1982

§ 102(e) Date: Jul. 16, 1982

[51] Int. Cl.³ ............... B60B 35/16; F16H 35/00
[52] U.S. Cl. ............................ 180/75; 74/801; 180/71
[58] Field of Search ............... 180/71, 73 R, 75, 88; 74/705, 764, 765, 789, 792, 797, 801

[56] References Cited

U.S. PATENT DOCUMENTS

| 2,941,423 | 6/1960 | Armington et al. | 180/73 R |
|---|---|---|---|
| 3,041,890 | 7/1962 | O'Brien | 180/75 |
| 3,459,070 | 8/1969 | Holdeman | 74/801 |
| 3,671,057 | 6/1972 | Cheers | 280/124 R |
| 3,896,895 | 7/1975 | Schultz et al. | 180/75 |
| 4,020,716 | 5/1977 | Tóth et al. | 180/73 R |
| 4,158,971 | 6/1979 | Szalai et al. | 74/801 |
| 4,158,972 | 6/1979 | Chamberlain | 74/801 |
| 4,191,073 | 3/1980 | Ritter, Jr. | 74/801 |
| 4,330,045 | 5/1982 | Myers | 74/764 |
| 4,380,274 | 4/1983 | Abraham et al. | 74/792 |

Primary Examiner—Joseph F. Peters, Jr.
Assistant Examiner—Donn McGiehan
Attorney, Agent, or Firm—Watts, Hoffmann, Fisher & Heinke

[57] ABSTRACT

A driving axle assembly (10) comprises a differential mechanism (34) driving axle shafts 36, 38, first and second gear reduction (40) are connected to the axle shafts remote from the differential mechanism for driving vehicle wheel assemblies (14, 16). The differential mechanism and gear reductions are supported by an axle assembly support housing comprising a housing frame (50) supporting the differential mechanism and first and second spindle assemblies (52, 54) attached to the frame and projecting to the respective gear reductions.

17 Claims, 5 Drawing Figures

VEHICLE AXLE ASSEMBLY

DESCRIPTION

Technical Field

The present invention relates to off highway load hauling vehicles and more particularly to driving axle assemblies used in such vehicles.

Background Art

Off highway load hauling vehicles such as haulers and dump trucks used in open pit mines, quarries, etc., commonly employ change gear transmissions connecting the vehicle engine with driving wheels via a propeller shaft and driving axle assembly. The driving axle assemblies typically include a differential mechanism connected to the propeller shaft, driving axle shafts projecting from the differential mechanism, and so-called final drive gear reductions connected between the axle shafts and the driven wheels. The differential mechanism and axles are generally contained in a tubular supporting housing extending between the drive wheels. The supporting housing is connected to the vehicle frame by a suspension arrangement and thus additionally forms a structural support for a substantial proportion of the vehicle weight and its payload. Additionally the supporting housing forms the structural element by which the traction and braking forces produced at the drive wheels are transmitted to the vehicle frame.

A more or less typical driving axle assembly employs an approximately cylindrical supporting housing having the differential mechanism supported within at a location between the drive wheels and the axle shafts extending laterally from the differential mechanism through bearing walls and seals closing the opposite ends of the supporting housing. The differential mechanism is fixed to a cover plate member detachably connected to the supporting housing. The propeller shaft driving connection extends through the cover plate to the differential mechanism. The differential mechanism is additionally fixed within the supporting housing by structurally strong links which react between the differential mechanism and the supporting housing to carry torque reaction forces exerted by the differential mechanism.

Prior art axle assemblies have utilized differential mechanisms designed to provide gear reductions of about 3:1 between the propeller shaft and the driving axles with the final drive gearing producing reductions of about 10:1 between the axles and the driven wheel hubs. The differential mechanisms in these vehicles are commonly formed by a bevel input gear fixed with respect to the propeller shaft, a bevel ring gear meshing with the input gear and a planet gear carrier fixed to the ring gear. Planet gears are supported by the carrier in mesh with side gears fixed to the respective axle shafts. The gear reduction provided by the differential mechanism is produced between the input and ring gears so that the ring gear diameter is substantially larger than the input gear. This gear reduction and the large amounts of power transmitted by the differential mechanism have resulted in substantial reaction torques being experienced by the differential mechanisms.

The final drives have usually been formed by single or compound epicyclic gear sets having a central sun gear, a plurality of planet gears disposed about the sun gear and connected together by a planet carrier, and a surrounding ring gear. The sun gear is usually driven by the axle shaft with drive transmitted to the wheels via either the planet gear carrier or the ring gear of one gear set. If a compound final drive is used, there may be a second complete epicyclic gear set with the output drive from the first gear set driving the wheels through the second gear set.

Prior art load hauling vehicles employing driving axle assemblies of the character referred to have had some disadvantages because of the size and support requirements for the differential mechanisms. The differential mechanisms have generally been bolted to their cover plates and to the supporting housing. Servicing or repair of a differential mechanism in the field necessitates its removal from the axle assembly housing and exposure of the differential gearing and components to dirt, dust and the elements. Removal and replacement of the differential mechanism has also been the typical method for changing the overall gear reduction ratio of the drive axle assembly. Because of their large size and weight the differential mechanisms usually have to be removed from the supporting housings by use of chain hoists supported on the vehicle frame and lowered to the ground or a pallet beneath the vehicle. This kind of operation is difficult and time consuming to perform and usually results in the differential mechanism getting dirty both when removed from the housing and when being replaced.

Moreover, the structural support members between the differential mechanism and the housing, while necessary and effective to brace the differential mechanism against movement caused by reaction torques, have tended to misalign the differential mechanism input and ring gears. When the vehicle is loaded and/or traversing rough terrain the axle supporting housing can experience load induced deformations causing the differential mechanism supports to shift the differential mechanism relative to the housing. This causes differential gearing misalignments and is therefore undesirable.

As the size and payload capacities of off highway load hauling vehicles of the character referred to have increased the use of proportionately larger components in drive axle assemblies has presented design and performance problems. For example, load dumping trucks for transporting payloads in excess of 120 tons are not uncommon and such vehicles require enormously strong and durable power trains and structural supporting components. In the past, this requirement has been met by increasing the size of the drive train and structural components. In a 100 to 120 ton capacity vehicle, enlarging conventional drive train components sufficiently to drive the vehicle results in large size differential mechanisms and concommittantly large drive axle housings. Drive axle assembly housings large enough to enclose conventional, enlarged differential mechanisms and support such vehicles may approach diametrical extents of nearly two meters. The weight, size and strength of the necessary axle assembly gearing and shafts are extremely great. In addition, ground clearances for such vehicles tend to be limited.

Disclosure of the Invention

The present invention provides a new and improved drive axle assembly for a load hauling vehicle or the like wherein the size and weight of the drive axle assembly is materially reduced compared to equivalent prior art drive axle assemblies, and repair or replacement of the differential mechanism is substantially simplified.

In accordance with a preferred embodiment of the invention a new drive axle assembly is provided wherein the differential mechanism provides a gear reduction of less than 2:1 and the final drive gear reduction is between 12 and 20 so that the differential mechanism, the support housing therefore and the axle shafts can be of relatively small size and light weight while remaining capable of transmitting adequate vehicle driving power and supporting the vehicle and payload.

The final drive gear reduction is provided by a compound epicyclic gear train having first and second gear sets each comprising a sun gear, a coacting planet gear assembly and a ring gear coupled to the planet gear assembly, the sun gear of the first gear set is driven from the axle shaft, the sun gear of the second set is driven from the first set ring gear and the first set planet gear assembly and second set ring gear are drivingly connected together to simultaneously produce the output drive through parallel paths.

The first gear set is disposed outboard of the second gear set and the sun gear and planet gear assembly are constructed and arranged to be readily removed and replaced by compatible but different gears to enable the drive axle assembly gear ratio to be altered. The differential mechanisms thus need not be disturbed when changing the axle assembly gear ratio.

In accordance with another important feature of the invention a new and improved driving axle housing assembly is provided which is of strong yet relatively light weight construction, easily fabricated, provides for easy removal and replacement of the differential mechanism and is of relatively small size. The new driving axle housing assembly can be used in conjunction with prior art differential mechanisms and final drives as well as drive train components constructed in the manner disclosed herein.

A preferred axle housing assembly comprises a housing frame assembly and spindle assemblies attached to and extending laterally from the housing frame. The axle shafts extend from the housing frame through respective spindle assemblies to the final drives. The housing frame assembly defines a differential mechanism receiving opening extending in a direction transverse to the axle shaft axes with the differential mechanism supported by the housing frame in the opening. The housing frame assembly also defines a bearing support for the vehicle propeller shaft end associated with the differential mechanism.

In the preferred drive axle assembly the differential mechanism is enclosed by a differential gear case detachably connected to the housing frame assembly in the receiving opening. The gear case and differential gears within it are removable as a unit from the housing frame upon withdrawal of the axles, removal of the propeller shaft driving connection and removal of connectors between the differential mechanism and housing frame assembly. The construction enables relatively simplified removal and replacement of differential gearing without exposure to harmful elements.

The differential mechanism receiving opening is preferably oriented generally vertically with the housing frame assembly including beam-like frame sections extending along the fore and aft side of the differential casing. This construction enables the vertical dimension of the axle housing adjacent the differential mechanism to be minimized, without sacrifice of structural strength, thus increasing the ground clearance.

Other features and advantages of the invention will become apparent from the following detailed description of a preferred embodiment made with reference with the accompanying drawings which form a part of the specifications.

Best Mode for Carrying Out the Invention

Figure 1:
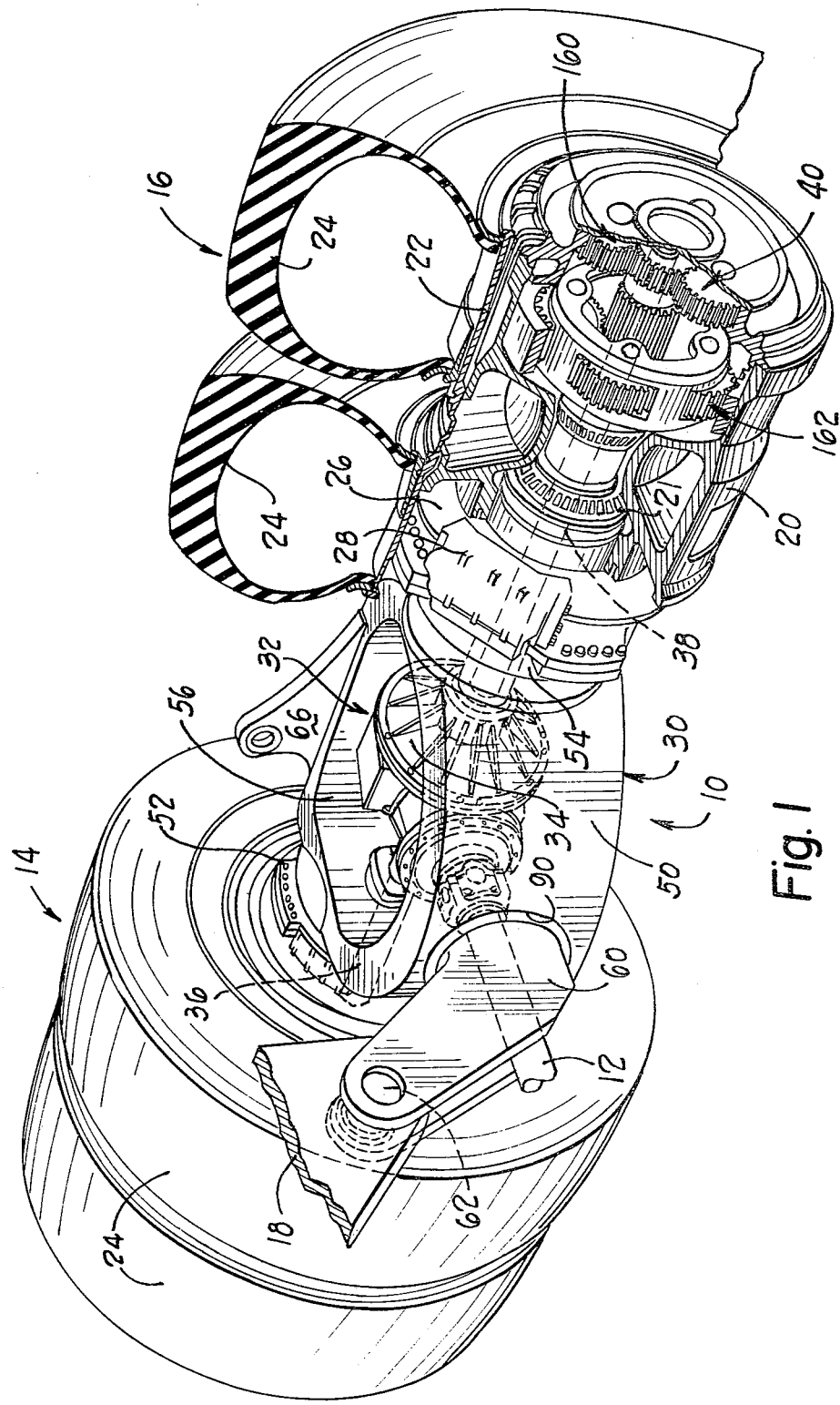
FIG. 1 is a perspective view of a portion of an off-highway load hauling vehicle embodying the present invention havings parts removed and parts illustrated in cross section.

A driving axle assembly 10 embodying the present invention is illustrated by FIG. 1 of the drawings as constructed for use in an off-highway load-hauling vehicle, only a part of which is illustrated. While the axle assembly 10 is usable with other heavy duty vehicles, for the purposes of the following description the axle assembly 10 is illustrated and described as used in a rear-driven, off-highway load-dumping truck capable of transporting payloads of at least 120 tons and having an internal combustion engine and a change gear transmission for transmitting driving power to the axle assembly 10 via a propeller shaft 12.

The driving axle assembly 10 is constructed and arranged to transmit drive to ground engaging vehicle propelling elements, in the form of wheel assemblies 14, 16, respectively, support a substantial proportion of the truck weight and its payload, and to transmit the vehicle traction forces from the wheel assemblies to the vehicle frame 18, only a portion of which is llustrated.

The wheel assemblies 14, 16 are of suitable or conventional construction and identical and therefore only the wheel assembly 16 is described briefly in its relationship to the driving axle assembly 10. The wheel assembly 16 includes a wheel body 20 rotatably supported by the axle assembly 10 via wheel bearings 21, a rim assembly 22 fixed to the wheel body 20 and extending about its outer periphery and pneumatic tires 24 mounted on the rim assembly and forming tractive ground engaging elements. The wheel body 20 carries a wheel brake rotor disc 26 which is frictionally engaged by brake pads of an actuator assembly 28 to produce vehicle braking forces. The actuator assembly is fixed to the axle assembly 10. The brake system may be of conventional construction and is not described further since it forms no part of the invention.

The driving axle assembly 10 includes a support housing assembly 30 and a drive transmission, generally indicated by reference character 32 for transmitting drive from the propeller shaft 12 to the wheel assemblies 14, 16. The drive transmission 32 includes a differential mechanism 34 driven from the propeller shaft 12, axle shafts 36, 38 extending oppositely from the differential mechanism 34 and final drive gear reductions 40 only one of which is illustrated in FIG. 1, connected to the axle shafts 36, 38 remote from the differential mechanism.

The housing assembly 30 comprises a housing frame 50 connected to the vehicle frame 18 by a suspension system, only a part of which is illustrated, and spindle assemblies 52, 54 fixed to and extending oppositely from the housing frame 50. The spindle assemblies support the wheel assemblies 14, 16 remote from the housing frame 50. The housing frame 50 extends about the differential mechanism 34 and defines a differential mechanism receiving opening 56 extending through it in a direction transverse to the direction of extent of the axle shafts 36, 38.

The housing frame 50 is connected to the vehicle frame via a suspension system for bearing vehicle weight and and for transmitting traction and braking forces from the wheel assemblies to the vehicle frame. A yoke 60 is fixed to the forward side of the housing frame 50 and extends forwardly and upwardly to the vehicle frame 18. The yoke is connected to the vehicle frame by a ball joint 62 of conventional construction. The yoke 60 transmits substantially all of the tractive and braking forces to the vehicle frame via the ball joint 62. The ball joint 62 enables limited universal movement of the driving axle assembly 10 relative to the vehicle frame 18. Substantially all of the vertical forces transmitted between the vehicle frame and the housing frame 50 are borne by a pair of ride struts, not shown, whose upper ends are connected to the vehicle frame and lower ends are connected, respectively, to laterally spaced knuckles 64 projecting rearwardly from the housing frame 50 (see FIG. 2). A limited amount of vertical swinging motion about the axis of the ball joint 62 is permitted by an articulating rod, not shown, connected to the vehicle frame and to the housing frame 50 via a knuckle 66 disposed on the rear upper side of the housing frame 50.

Figure 2:
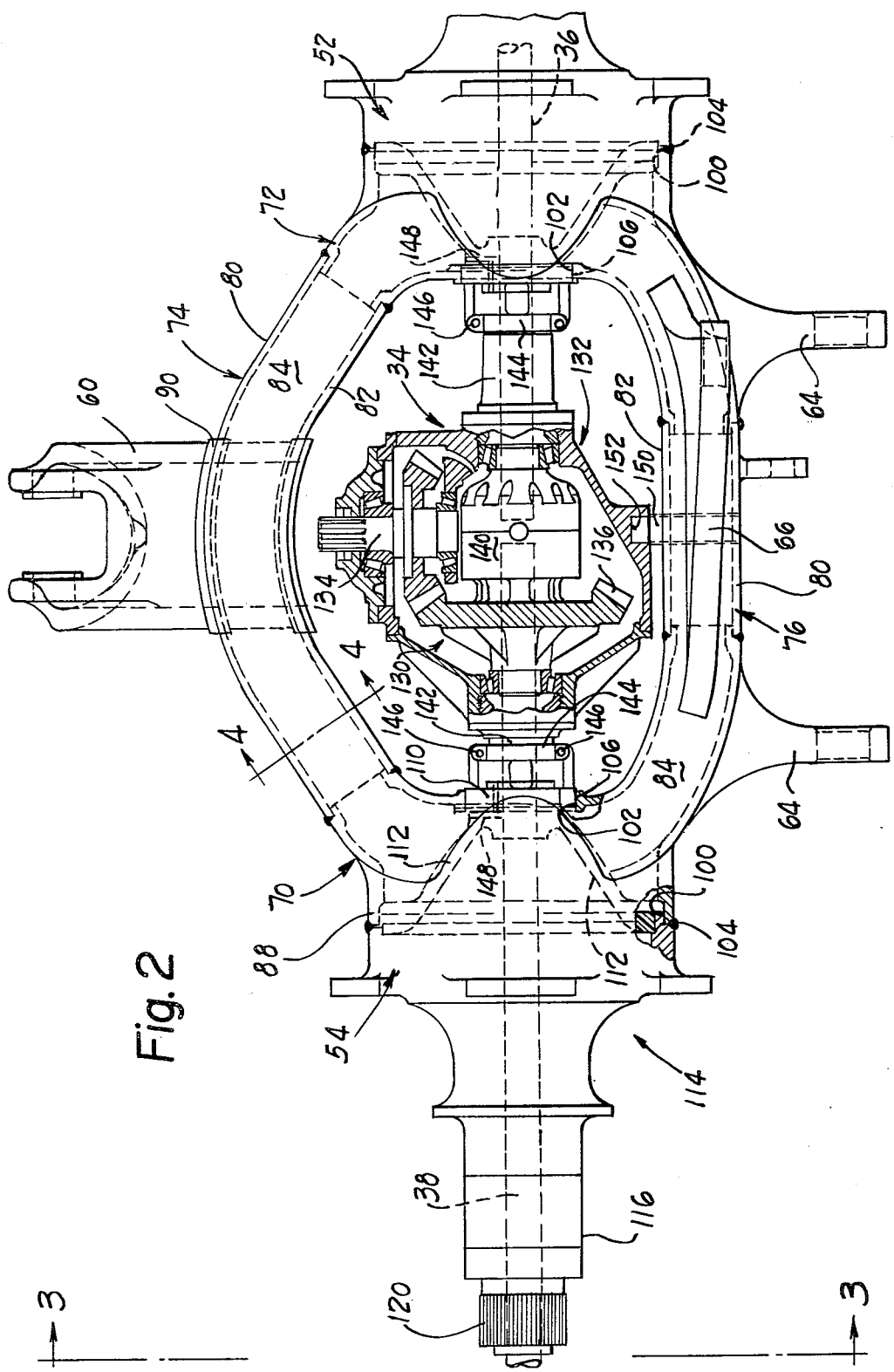
FIG. 2 is a top plan view of a portion of the apparatus of FIG. 1 having parts removed and parts illustrated in cross section.
Figure 3:
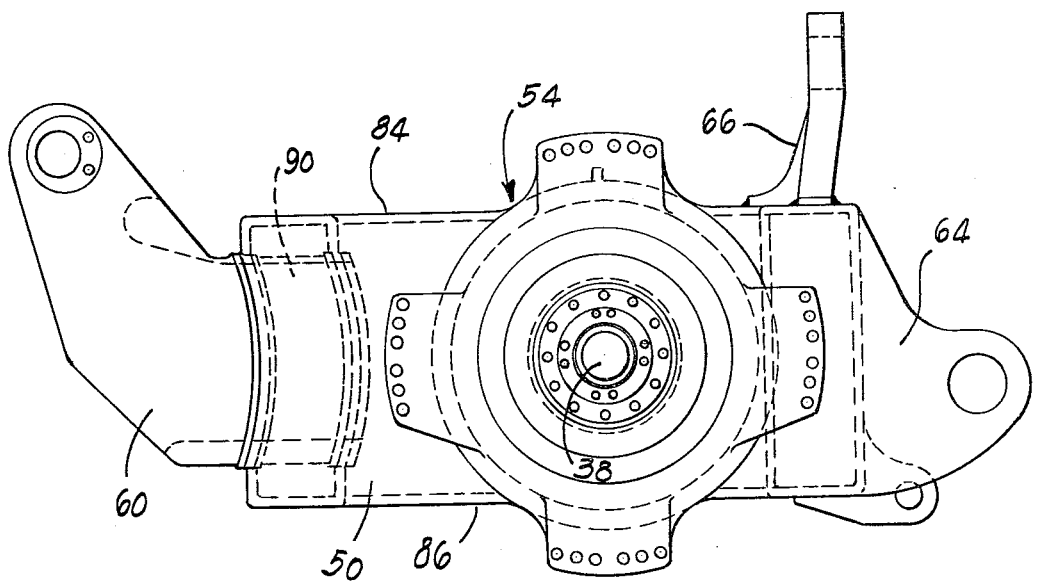
FIG. 3 is an elevational view seen approximately from the plane indicated by the line 3—3 of FIG. 2.
Figure 4:
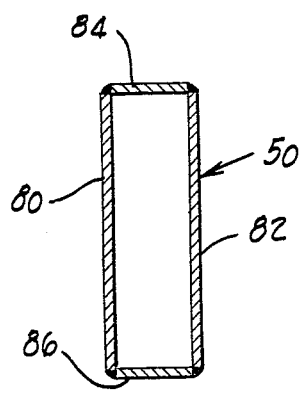
FIG. 4 is a cross sectional view seen approximately from the plane indicated by the line 4—4 of FIG. 2.

The housing frame 50 is preferably formed by a weldment comprising cast lateral frame sections 70, 72 and tubular box beam sections 74, 76 extending between the frame sections 70, 72 along the fore and aft sides, respectively, of the differential mechanism 34 (see FIG. 2). The tubular box beam frame sections are each formed by spaced vertically oriented plate-like webs 80, 82 and horizontally oriented plate-like flanges 84, 86 welded between the upper and lower edges of the web plates.

The lateral frame sections 70, 72 are preferably constructed and arranged for providing a generally cylindrical spindle assembly receiving section 88, and providing a smooth, strong transition to rectangular cross sectional configuration where the lateral frame section 70, 72 are joined to the box beam sections. In the preferred and illustrated frame assembly the 10 rectangular cross section ends of the frame sections 70, 72 form end portions which are telescopically fitted into the adJacent open end of the respective box beam sections 74, 76 and the sections 70, 72 and 74, 76 are welded together at their junctures.

The yoke 60 is integrally formed with a cast cylindrical bearing housing 90 which is fitted in a conforming opening in the forward box beam section 74. The propeller shaft drive is transmitted to the differential 34 through the bearing housing 90. The bearing housing 90 is preferably welded in place to the beam section 74.

It should be appreciated that the cast lateral frame sections 70, 72 and the box beam sections 74, 76 are all tubular so that the weight of the housing frame 50 is minimized. The wall thickness of the lateral frame section castings and the plates forming the box beam sections are sufficiently great that the assembled housing frame 50 is enormously strong and rigid. The differential receiving opening 56 is formed by the generally vertically oriented web plates 80, 82 and corresponding walls of the cast lateral frame sections 70, 72 so the opening 56 is generally vertically oriented. The vertically oriented walls of the housing frame 50 provide extremely great resistance to deformation from vertically imposed load forces and thus the vertical dimension of the housing frame 50 can be maintained relatively small to insure substantial ground clearance beneath the axle assembly 10.

The spindle assemblies 52, 54 are both cast, generally cylindric tubular members which are welded in place to the lateral frame sections 70, 72 respectively. As is best seen in FIG. 2, the frame sections 70, 72 are formed with axially spaced locating, or guide faces 100, 102 which are preferably cylindrical, turned faces which mate with conforming guide faces 104, 106 formed on the respective spindle assemblies. The guide faces are closely toleranced so that when the respective guide faces of a spindle assembly and frame section are engaged, the spindle assembly is precisely aligned with the housing frame 50. When the spindle assemblies are so aligned with the housing frame 50, the junctures of each spindle assembly and associated frame section are welded together to complete the assembly of the axle housing 30. This method of construction avoids costly fixturing of the parts for welding which would otherwise be necessary in order to fabricate the axle housing assembly.

Figure 5:
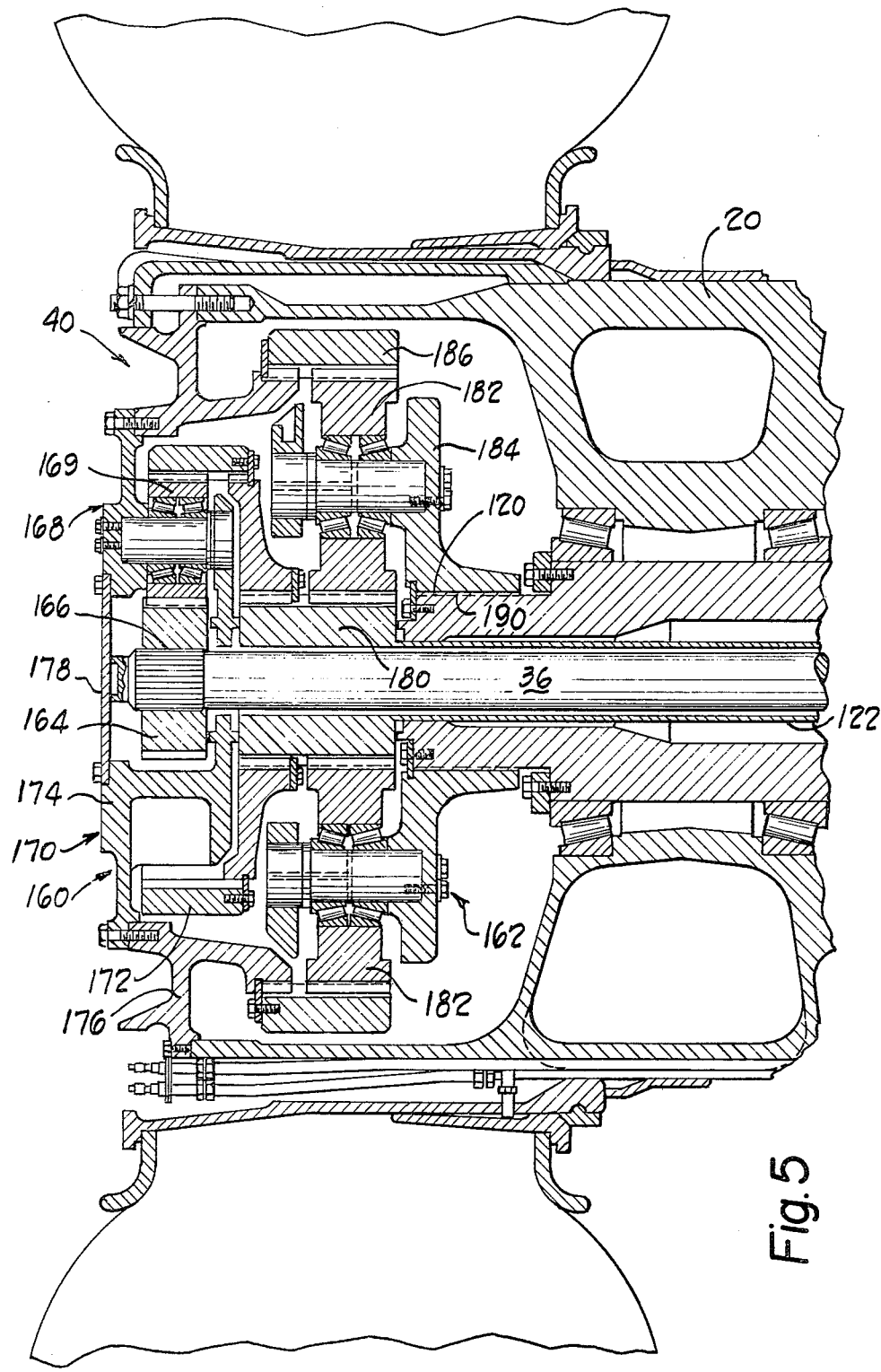
FIG. 5 is a cross sectional view of part of the apparatus illustrated in FIG. 1 on an enlarged scale.

Each spindle assembly is identical and therefore only the spindle assembly 54 is described in detail. The spindle assembly 54 includes an axle shaft supporting hub structure 110 surrounded by the guide face 106 and supported by a series of cast webs 112 projecting into the frame section 72. A bearing and seal, not shown, are disposed within the axle supporting hub 110. The external surfaces of the spindle assembly include a wheel brake section, generally designated by the reference character 114, a wheel bearing supporting cylindrical section 116 and a splined end portion 120 projecting from the bearing support portion 116. A generally cylindrical axle shaft housing tube 122 (only part of which is shown in FIG. 5) extends between the opposite ends of the spindle assembly closely surrounding but spaced from the axle shaft. FIGS. 1 and 5 illustrate the wheel assembly mounted on the spindle assembly as conventional.

In accordance with an important feature of the present invention, the differential mechanism 34 and associated final drive gear reductions 40 are constructed and arranged so that a gear reduction from the propeller shaft 12 to the axle shafts 36, 38 of about 1.5:1 is provided by the differential mechanism 34 while a gear reduction of approximately 12:1 to 20:1 is provided by the final drive gear reductions 40. In a successfully tested differential mechanism 34 constructed in accordance with the present invention a gear reduction ratio of 1.56:1 between the propeller shaft and axle shafts was employed. This differential mechanism gear reduction enables the size of the differential mechanism to be reduced substantially from the size of a conventional differential mechanism providing a gear reduction of approximately 3:1 in an equivalent vehicle. Moreover, the axle shafts 36, 38 can be smaller and lighter since they operate at higher speeds and are not required to deliver the torque which would otherwise be required of axle shafts used with a 3:1 differential mechanism. Still further, the reaction torque experienced by the differential mechanism 34 is significantly less than the reaction torque would otherwise be with a conventional higher ratio reduction.

As illustrated by FIG. 2, the differential mechanism 34 includes differential gearing 130 and a gear case assembly 132 enclosing the differential gearing. Drive is introduced into the differential mechanism 34 by an input shaft and bevel gear 134 which runs in mesh with a bevel ring gear 136. The bevel gear diameters are related to provide the desired gear reduction and thus the bevel gear 136 is not substantially larger than the input gear. The ring gear 136 directly drives a planet gear carrier 140 which rotatably supports a plurality of internal bevel planet gears rotatable about axes extending perpendicular to the rotation axis of the planet gear carrier. The planet gears each mesh with bevel side gears splined to the inner ends of the axle shafts 36, 38. The arrangement of planet gears, side gears and the axle shafts is conventional so these components are not illustrated.

When the vehicle is driven along a straight course the propeller shaft drive is transmitted from the input shaft and bevel gear 134 through the ring gear 136 and planet carrier 140 and equally to the side gears carried by the axle shafts. Equal power is thus supplied to the wheel assemblies 14, 16. When the vehicle corners, the drive continues to be supplied to the wheel assemblies 14, 16; however, the planet carrier 140 rotates relative to both axle shaft side gears enabling the wheel assemblies to rotate at different speeds and permitting the vehicle to corner without skidding the tires of either wheel assembly.

The differential gear case 132 completely encloses the differential mechanism gearing and supports bearings for the input shaft and gear 134 and the planet gear carrier 140. The preferred gear case 132 is formed from several cast metal casing members which are assembled with screws. Axle sleeves 142 extend from opposite lateral ends of the gear case assembly to the adjacent laterally inner ends of the spindle assemblies. The axle sleeves surround and protect the axle shafts, and are screwed in place to the gear case 132 at one end. The opposite ends are clamped to the respective spindle assemblies by a semi-cylindrical keeper member 144 which is held in place by screws 146.

The interior of the differential gear case and axle sleeves is vented into the housing frame 50 via vent passages 148 drilled in the spindle assemblies 52, 54. When the differential gearing operates the oil and atmosphere in the gear case heats up and must be vented. Venting the gear case into the frame 50 provides for a large, closed receptacle for any oil which may be expelled.

The differential mechanism 34 is located and supported within the housing frame 50 by a locating member 150 extending between the differential mechanism 34 and the housing frame 50. In the illustrated and preferred axle assembly 10 the member 150 is defined by an elongated pin supported in a guide opening through the frame section 76 and projecting into a conforming socket 152 in the gear case 132. The pin 150 can be slid, in the direction of its extent, into and from the socket 152 when the pin and socket are aligned. The pin and socket are located relative to each other so that when the differential mechanism is properly located within the housing frame 50, i.e., correctly positioned laterally within the housing frame 50 and with the axis of the input shaft and gear 134 aligned with the propeller shaft axis, the pin 150 can be slid into the socket 152 and fixed in position in the housing frame 50 by a suitable fastener, not illustrated. The pin 150, which is preferably formed by a cylindrical rod-like element, is sufficiently strong to maintain the differential mechanism position stable regardless of the torque reaction forces experienced by the gear case 132.

Removal and replacement of the differential mechanism 34 is relatively easily accomplished. The axle shafts 36, 38 are constructed to that each can be axially withdrawn from the differential mechanism 34 through the surrounding sleeve 142 and spindle assembly. The input shaft and gear 134 is detachably connected to the propeller shaft by a spline connection enabling removal of the propeller shaft drive connection. When the axle and propeller shafts have been removed from the differential mechanism the locating pin 150 is detached and withdrawn from the socket 152 and the keeper members 144 are unscrewed and removed. The differential mechanism 34 and then be bodily removed from the frame 50 and lowered to the ground below the vehicle. This is accomplished with the gear case 132 intact and thus without exposing the differential gearing to harmful dirt and dust.

The final drive gear reductions 40, as indicated previously, provide speed reductions between the respective axle shafts 36, 38 wheel assemblies 14, 16 of between about 12:1 and 20:1 so that the overall gear reduction provided by the drive transmission 32 ranges from about 18:1 to about 30:1. The gear reductions 40 are identical and therefore only one is illustrated and described in detail. Referring now to FIG. 5 the gear reduction 40 is preferably a compound epicyclic gearing arrangement formed by first and second epicyclic gear sets 160, 162 coacting to transmit drive from the axle shaft 36 to the wheel assembly 14.

The first gear set 160 comprises a sun gear 164 fixed to the projecting end of the axle shaft by a spline connection 166, a planet gear assembly 168 including planet gears 169, only one of which is illustrated, a planet gear carrier 170, and a ring gear 172 surrounding the planet gears 169. The planet gears 169 mesh with the sun gear and the ring gear, are rotatable with respect to the carrier 170, and coact with the ring and sun gears so that the carrier itself rotates about the sun gear.

The preferred planet gear carrier 170 is formed by a planet gear cage 174 mounting the planet gears 169, a drive transmitting member 176 connected between the gear cage 174 and the wheel body 20 and a circular cover plate 178 for closing the center of the planet gear cage 174. The drive transmitting member 176 is detachably connected to the planet gear cage 174 and to the wheel body 20 by drive transmitting screws. The cover plate 178 forms a closure for the gear reduction 40 as well as limiting axial movement of the axle shaft.

As the sun gear 164 is driven by the driving axle shaft the planet gears 169 rotate and orbit about the sun gear, driving the planet gear carrier 170 and transmitting torque to the wheel body via the drive transmitting member 176. In addition, the ring gear 172 is driven about the drive axle shaft axis and drive from the ring gear 172 is transmitted to the second gear set 162.

The second gear set 162 is formed by a sun gear 180 loosely surrounding and spaced from the axle shaft, planet gears 182 disposed about and in mesh with the sun gear 180, a planet gear carrier 184 and a ring gear 186 surrounding and in mesh with the planet gears 182. The planet gears are rotatably mounted on the planet gear carrier 184 and the carrier includes a splined central hub 190 fixed to the splined projecting end of the spindle assembly 52 to fix the planet gear carrier 184 against rotation. When the sun gear 180 is driven the planet gears 182 are driven and drive the ring gear 186. The ring gear 186 is connected to the drive transmitting member 176 via which the ring gear 186 transmits drive to the wheel assembly.

Since the first gear set planet gear carrier and the second gear set ring gear 186 are connected together and to the wheel assembly it should be appreciated that output power is delivered to the wheel assembly from the gear reduction 40 along two paths. It has been found that approximately 25% of the output power from the gear reduction 40 is delivered from the planet gear carrier 170 while the remaining power is delivered via the ring gear 186. Providing a pair of power delivery paths with the gear reduction 40 enables the gear reduction to be formed from somewhat lighter gears and associated components than would otherwise be required if all of the power transmitted from the axle to the wheel assembly were channeled serially through both gear sets.

The gearing ratio produced by the gear reductions 40 can be relatively easily changed by removing and replacing the sun and planet gears of the first gear set 160. The overall ratio of the drive transmission 32 can thus be changed without requiring any changes in the differential mechanism 34. The gear reduction 40 is modified by unscrewing the gear cage 174 from the drive transmitting member 176 and removing the gear cage together with the planet gears and the cover plate 178. The sun gear 164 is then be slipped from the splined end of the axle shaft and replaced with a similar but different sun gear. A replacement planet gear cage carrying different planet gears which mesh with both the replacement sun gear and the ring gear 172 is then inserted and screwed in place to the drive transmitting member 176. The cover plate 178 is secured to the cage to complete the modification. All of this is accomplished without jacking up the vehicle or any further drive transmission 32 disassembly. The differential mechanism 34 need not be altered in any way.

When the differential mechanism 34 is to removed as indicated previously the axle shafts 36, 38 must be removed from the differential mechanism and this is easily accomplished by simply unscrewing the cover plate 178 and axially withdrawing the axle shafts 36, 38 until they are clear of the differential gear casing.

While a single embodiment of the present invention has been illustrated and described herein in considerable detail the present invention is not to be considered limited to the precise construction shown. Various adaptations, modifications, and uses of the invention may occur to those skilled in the art to which it relates and the intention is cover hereby all such adaptations, modifications and uses which come within the scope or spirit of the appended claims.

What is claimed is:

1. In an off highway load hauling vehicle having an engine driven propeller shaft for transmitting drive to vehicle propelling ground engaging elements, a driving axle assembly comprising:
   (a) a differential mechanism including differential gearing connected to said propeller shaft and to first and second output driving axle shafts;
   (b) first and second gear reduction means connected, respectively, to said first and second output driving axle shafts remote from said differential mechanism, said gear reduction means transmitting drive to said ground engaging vehicle propelling elements from said axle shafts; and
   (c) an axle assembly support housing comprising:
      (i) a housing frame supporting said differential mechanism;
      (ii) first and second spindle assemblies attached to said housing frame and projecting therefrom to said respective gear reduction means;
      (iii) said axle shafts supported by and extending through said respective spindle assemblies to said housing frame for connection to said differential mechanism;
   (d) said differential gearing producing a gear reduction ratio of about 1.5:1 between said propeller shaft and said axle shafts and said gear reduction means producing a gear reduction ratio ranging from about 14:1 to about 21:1 between said axle shafts and the gear reduction means output.

2. The axle assembly claimed in claim 1 wherein each gear reduction means comprises first and second epicyclic gear sets each having a sun gear, a plurality of planet gears carried by a planet gear carrier and a ring gear surrounding the planet gears, the axle shaft driving the sun gear of the first set, and said first planet gear carrier and ring gear of the second set connected together in driving relationship to a ground engaging vehicle propelling element.

3. The axle assembly claimed in claim 2 wherein said second gear set is interposed between said first gear set and said differential mechanism and further including connecting means for detachably securing said first planet gear carrier to said axle assembly to permit removal and replacement of said sun gear and planet gears of said first gear set for altering the axle assembly gear ratio without requiring further disassembly of said axle assembly.

4. The vehicle claimed in claim 1 wherein said housing frame structure comprises a frame-like member extending about said differential mechanism, said frame-like member defining support sections for said propeller shaft and said axle shafts, said differential mechanism further including a case enclosing the differential gearing therein, said case detachably connected to said housing frame structure.

5. The vehicle claimed in claim 1 wherein each of said spindle assemblies comprises first and second locating faces spaced from each other and engageable with respective conforming locating faces on said frame-like member, said locating faces engaged when a spindle assembly and the frame-like member are properly aligned and further including means for securing said spindle assemblies and frame-like member together with said locating faces engaged.

6. The vehicle claimed in claim 1 wherein said differential mechanism further comprises a case enclosing said differential gearing, said case comprising opposed supporting sections extending about said axle shafts and connecting means for detachably connecting said case to said frame-like member.

7. The vehicle claimed in claim 6 further including a connecting member extending between said frame-like member and said case said connecting member coacting between said frame-like member and said case to brace said case against reaction torque.

8. A driving axle assembly comprising:
(a) a differential mechanism;
(b) first and second axle shafts driven from said differential mechanism and projecting therefrom;
(c) first and second spindle assemblies surrounding and supporting respective projecting portions of said first and second axle shafts;
(d) a housing frame disposed between and fixed to said spindle assemblies, said housing frame defining a differential mechanism receiving opening within which said differential mechanism is disposed, said opening oriented in a direction transverse to the directions of extent of said axle shafts and support structure for supporting said differential mechanism on said housing frame; and,
(e) connecting means for detachably securing said differential mechanism to said housing frame.

9. The driving axle assembly claimed in claim 8 wherein said differential mechanism comprises a differential gear set for transmitting drive from a vehicle propeller shaft to said axle shafts and a gear case substantially enclosing said differential gear set, said gear case engaged with said housing frame.

10. The driving axle assembly claimed in claim 8 or 9 wherein said housing frame extends peripherally about said differential mechanism and said opening is oriented generally vertically.

11. The axle assembly claimed in claim 10 wherein said housing frame comprises at least a frame section extending partially about said differential mechanism, said frame section comprising a generally vertically oriented structural plate-like web and at least a generally transversely extending flange plate fixed to said web.

12. The axle assembly claimed in claim 11 wherein first and second frame sections are respectively disposed fore and aft of said differential mechanism, said housing frame member further including spindle assembly receiving sections disposed between adjacent ends of said first and second frame sections.

13. The axle assembly claimed in claim 12 wherein said first and second frame sections each comprise a rectangular cross section frame having vertical walls formed by first and second spaced web plates and horizontal upper and lower walls formed by spaced flanges.

14. The axle assembly claimed in 13 wherein said spindle assembly receiving sections are defined by cast frame members each having a generally cylindrical spindle assembly engaging portion and at least one rectangular shaped cross sectional portion conforming to the cross sectional shape of said frame sections.

15. The axle assembly claimed in claim 9 further including a differential mechanism engaging member supported by said housing frame member and connected to said gear case.

16. The assembly claimed in claim 15 wherein said differential mechanism engaging member comprises a pin supported by said housing frame and said gear case comprises structure conforming to said pin for locating said gear case relative to said housing frame.

17. A final drive gear reduction for transmitting drive from an axle shaft to an output device comprising a compound epicyclic gear train having first and second gear sets each comprising a sun gear, a coacting planet gear assembly and a ring gear coupled to the planet gear assembly, the sun gear of the first gear set driven from the axle shaft, the sun gear of the second set being driven from the first set ring gear, and the first set planet gear assembly and second set ring gear drivingly connected together to simultaneously produce the output device drive.

* * * * *